Dec. 8, 1936.                G. KRIEGE                2,063,442
LOCK VALVE
Filed Nov. 5, 1932
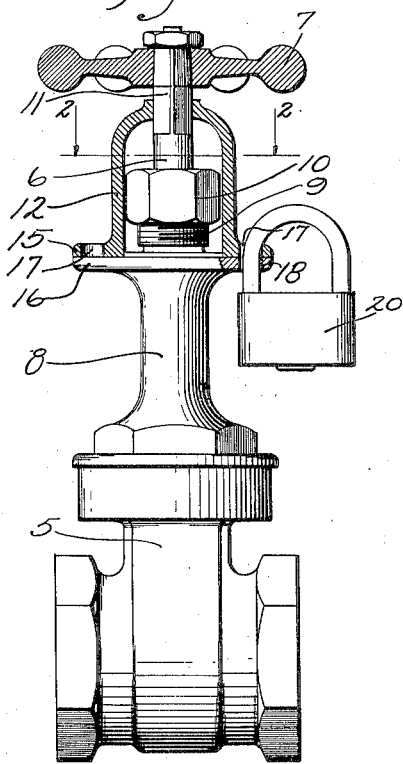
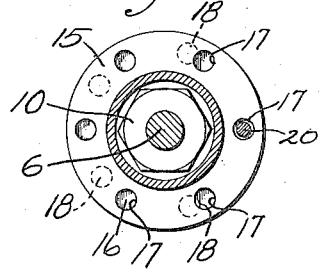
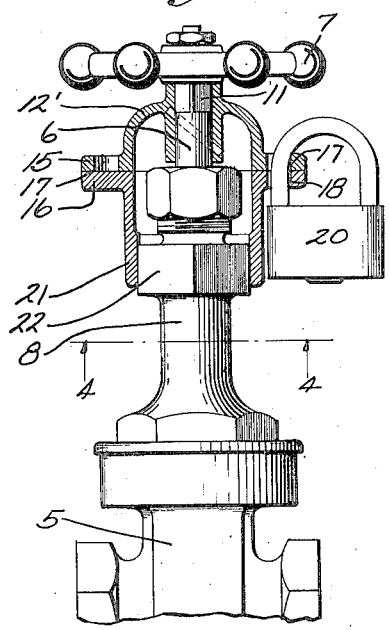
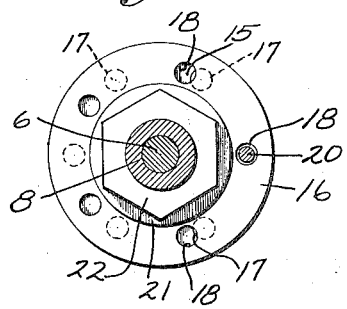
Inventor
George Kriege
By Wheeler, Wheeler and Wheeler
Attorneys Patented Dec. 8, 1936

2,063,442

UNITED STATES PATENT OFFICE 2,063,442

LOCK VALVE

George Kriege, Milwaukee, Wis., assignor to Milwaukee Valve Company, Milwaukee, Wis., a corporation of Wisconsin Application November 5, 1932, Serial No. 641,358

7 Claims. (Cl. 70—125)

This invention relates to improvements in lock valves.

It is one of the primary objects of the invention to provide a valve locking means which will not only protect the valve actuating handle from unauthorized manipulation, but will also guard the packing so that the fluid controlled by the valve cannot be released through unauthorized tampering with the packing nut.

It is a further important object of the invention to provide a valve locking device operative between the valve casing and the valve actuating mechanism in such a manner that the parts may be locked in any desired sequence of positions with slight angular variation between them. The position of the valve control at the time of locking is not a constant. Due to wear and other factors, the position of the valve controls at the time the valve is firmly seated on one occasion may be quite different from the relative position of the parts on another occasion. Yet it is desirable that the valve should be fully closed before being locked. Hence it is important that the lock should be applicable to the parts with relatively minute increments of change of relative position.

To accomplish this result, particularly in the valve in which the packing is also protected by the lock, is one of my objectives.

In the drawing:

Figure 1 is a side elevation of a valve mechanism, with the locking shell partially broken away to an axial section, and made in accordance with this invention.

Figure 2 is a detail view of the valve mechanism taken in section in the plane indicated at 2—2 in Figure 1.

Figure 3 is a view similar to Figure 1 illustrating a modified exemplification of the invention.

Figure 4 is a detail view of the valve mechanism taken in section in the plane indicated at 4—4 in Figure 3.

Like parts are identified by the same reference characters throughout the several views.

The exact nature of the valve mechanism housed within the valve casing 5 is immaterial to a discussion of the present invention. It may be of any desired type and may be operated in any desired manner from the valve control shaft 6 which is provided with the usual hand wheel 7.

A portion of the length of the shaft is enclosed in a sleeve 8 which carries a packing gland 9 and packing nut 10 in the usual way. These parts are of conventional design with the exception of the provision for the application of a lock in accordance with this invention.

The present invention contemplates the application of a lock between sleeve 8 and control shaft 6. For this purpose the control shaft 6 is squared or otherwise splined at 11 below the handle 7, and a shroud or hood member 12 having an opening of like conformation is nonrotatably, but slidably, fastened to the control shaft so that it will necessarily turn with said shaft but will permit such endwise movement of the shaft as may be required for the control of the valve. It is only necessary to provide for endwise movement within the range of adjustment which must require consideration in the locking of the valve.

The hood 12 completely encloses the packing nut 10 when the valve is closed but, if the hood is unlocked, the packing nut may readily be exposed either by opening the valve or by removing the hand wheel 7. For the purpose of locking the parts, I prefer to provide the hood 12 and the sleeve 8 with complementary flanges 15 and 16 respectively. These flanges have apertures which are preferably spaced equidistantly about each flange but do not correspond in number as between the flanges. For example, the flange 15 may have six holes 17 while the flange 16 on the valve casing may have five holes 18. With minute changes of position of the valve control shaft 6, the pairs of holes in the two flanges may be made to register successively to receive the padlock 20. Thus, in Fig. 2, a shackle of the padlock is applied through the holes at the right of the view.

If the enclosed shaft 6 and flange 15 are turned clockwise, it will be obvious that a very slight angular movement will bring into registry the holes 17 and 18 at the lower right of Fig. 2. If the control shaft and sleeve 15 are turned counterclockwise, a very slight angular change of position will bring into registry the holes 17 and 18 at the upper right of the view. If the rotation is continued, other pairs of holes will register successively.

The construction shown in Fig. 3 operates similarly but is advantageous in some respects because it permits a very direct access to the packing nut. In this construction the flange 16 is not formed upon the valve casing itself, but upon a supplemental hood element 21 splined to the hexagonal head 22 of sleeve 8. The upper part of the hood 12' corresponds to that already described except that it is shorter. The respective flanges 15 and 16 co-act in the same manner in both devices, and the padlock 20 is applied in the same way. If, however, the padlock is removed, the shroud element 21 will instantly be movable, in any valve position, to afford immediate access to packing nut 10.

Both devices provide for locking the valve in practically any desired position, thereby assuring that it may be satisfactorily closed when locked. Both devices afford full protection to the packing nut as well as the valve operating device. Both devices provide a positive lock between the valve casing and the valve operating controls.

I claim:

1. In a valve, the combination with a valve casing provided with a packing gland, and a valve control including a part operable through said gland and having a predetermined axial movement terminating in a variable closed position, of means for locking said control in fixed relation to said casing, said means including a hood nonrotative and slidable relative to said part and enclosing said gland thereby to render it inaccessible when locked, said hood being movable with said part into a fixed closed position, and said slidable relation permitting independent movement of said part and said hood to their respective closed positions.

2. In a valve structure, the combination with a casing member and a control member, of complementary locking parts applied to the respective members, one of said parts being splined to its respective member for nonrotative and slidable relationship, and means whereby said parts may be secured to render said control member immovable with respect to said casing member in a valve adjusting direction.

3. In a valve structure, the combination with a casing member provided with a packing device and a control member movable through said device and provided with a hand grip, of locking means for said packing device and control member applicable to said control member between said grip and said packing device and including a hood element enclosing said packing device and having a part connected with one of said members and movable when said means is unlocked into a position permitting free access to said packing device.

4. In a valve mechanism, the combination with a flanged casing member provided with a packing gland and nut adjacent said flange, of a valve operating shaft provided with a handle and extending through said packing gland and nut, and a flanged hood splined to said shaft between said handle and nut and enclosing said nut, said flanges being complementary to each other and having means whereby they may be locked to restrain relative movement between said shaft and casing.

5. In a valve locking device, the combination with a casing having a packing device and a head adjacent said packing device, of a shaft rotatable in said packing device, a flange carrying member connected with said shaft for rotation therewith, a complementary member splined to the head of said casing enclosing said packing device, and having a flange complementary to said first mentioned flange, and means whereby said flanges may be locked together to secure said shaft against rotation respecting said casing and to protect said packing device against unauthorized access, said packing device being instantly accessible by a relative sliding movement of said enclosing member when said flanges are released.

6. In a valve locking device, the combination with a valve casing having a packing gland and nut and a valve stem movable slidably and rotatably in the gland and nut, a hand wheel on said stem and a hood slidable on said stem between said nut and said wheel thereto for rotation therewith, and means for locking the hood against rotation relatively to said casing, said hood having a part covering the gland and nut and holding said stem against rotation when so locked but movable when unlocked into a position permitting free access to said gland and nut.

7. In a valve the combination of a casing and a rotative stem axially movable into valve opening and closing positions, a locking member fixed with said casing, and a hood member slidably but non-rotatively fixed with said stem and movable therewith into contact with said locking member, means for locking said members together to prevent rotation of said stem, the slidable connection of said hood with said stem preventing interference by said members with further axial movement of said rotative stem upon contact of said members with each other.

GEORGE KRIEGE.